United States Patent
Tanabe

(10) Patent No.: US 8,941,258 B2
(45) Date of Patent: Jan. 27, 2015

(54) POWER SUPPLY DEVICE AND IMAGE FORMING APPARATUS INCLUDING THE POWER SUPPLY DEVICE

(75) Inventor: Jun Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 747 days.

(21) Appl. No.: 13/225,798

(22) Filed: Sep. 6, 2011

(65) Prior Publication Data

US 2012/0062188 A1 Mar. 15, 2012

(30) Foreign Application Priority Data

Sep. 9, 2010 (JP) ................. 2010-202017
Jun. 17, 2011 (JP) ................. 2011-135134

(51) Int. Cl.
  *H02J 3/02* (2006.01)
  *H02M 7/48* (2006.01)
  *H02M 7/5387* (2007.01)
  *H02M 1/00* (2006.01)

(52) U.S. Cl.
  CPC ............ *H02M 7/48* (2013.01); *H02M 7/53873* (2013.01); *H02M 2001/0093* (2013.01)
  USPC .............................................. 307/2; 399/88

(58) Field of Classification Search
  USPC ...................... 399/88, 89, 55; 307/2
  See application file for complete search history.

(56) References Cited

U.S. PATENT DOCUMENTS

| | | | |
|---|---|---|---|
| 6,771,522 B2 * | 8/2004 | Hayashi et al. ................. | 363/71 |
| 6,775,524 B2 * | 8/2004 | Takeyabu et al. .......... | 455/127.1 |
| 7,333,781 B1 * | 2/2008 | Stockstad et al. ............. | 455/126 |
| 8,093,879 B2 * | 1/2012 | Yamamoto et al. ........... | 323/285 |
| 8,144,043 B2 * | 3/2012 | Risbo et al. .................... | 341/144 |
| 8,245,089 B2 * | 8/2012 | Igarashi ........................ | 714/712 |
| 8,305,020 B2 * | 11/2012 | Suzuki et al. ............ | 318/400.21 |
| 2009/0128103 A1 * | 5/2009 | Noda ............................ | 323/247 |

FOREIGN PATENT DOCUMENTS

JP 2003333858 A * 11/2003
JP 2009-122564 6/2009

OTHER PUBLICATIONS

Paul Horowitz and Winfield Hill, The Art of Electronics, 1989, Cambridge University Press, Second Edition, pp. 37-39.*

* cited by examiner

*Primary Examiner* — Jared Fureman
*Assistant Examiner* — Brett Squires
(74) *Attorney, Agent, or Firm* — IPUSA, PLLC

(57) ABSTRACT

A power supply device includes an AC generation part having a sinusoidal wave generation part generating a first sinusoidal wave signal, an integrator integrating a difference between the first sinusoidal wave signal and a feedback signal, a triangular wave generation part generating a triangular wave signal, a comparator comparing an output of the integrator and the triangular wave signal and outputting a PWM signal, a switching drive part amplifying the PWM signal and outputs an amplified PWM signal, a filter converting the amplified PWM signal into a second sinusoidal wave signal, a transformer increasing a voltage of the second sinusoidal wave signal and outputting an AC voltage, and a voltage divider dividing the AC voltage and generating the feedback signal, and a DC generation part generating a DC voltage. The power supply device superimposes the AC voltage and the DC voltage and outputs a superimposed voltage.

11 Claims, 23 Drawing Sheets

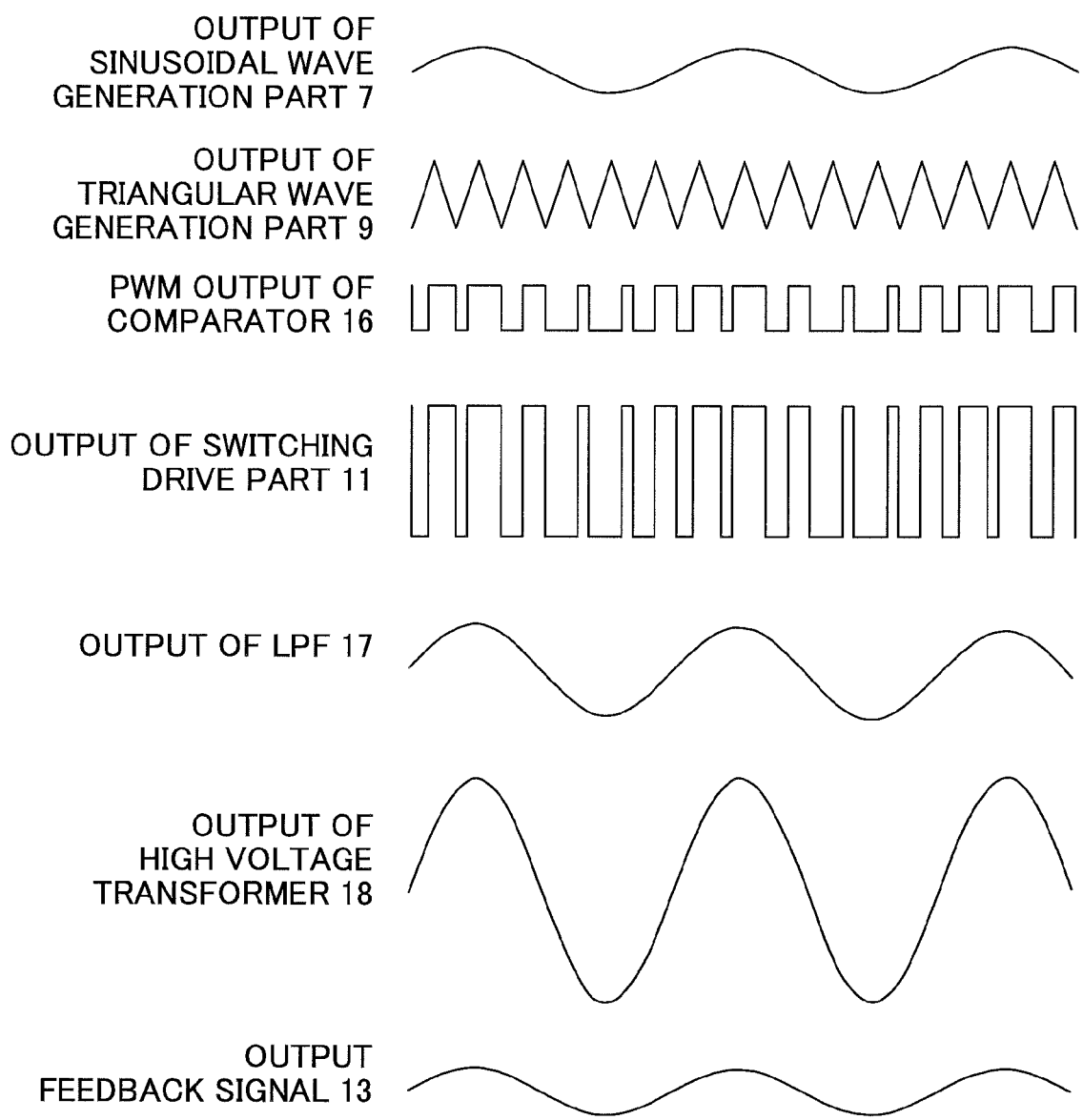

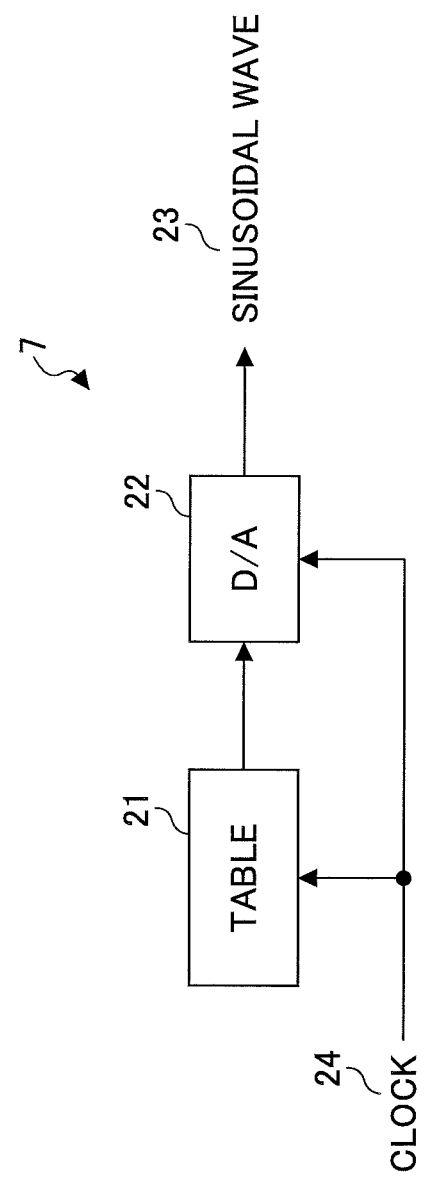

FIG.4

| | TABLE | |
|---|---|---|
| | DENARY | BINARY (5bit) |
| 0 | 19 | 10011 |
| 1 | 25 | 11001 |
| 2 | 29 | 11101 |
| 3 | 31 | 11111 |
| 4 | 31 | 11111 |
| 5 | 29 | 11101 |
| 6 | 25 | 11001 |
| 7 | 19 | 10011 |
| 8 | 13 | 01101 |
| 9 | 7 | 00111 |
| 10 | 3 | 00011 |
| 11 | 1 | 00001 |
| 12 | 1 | 00001 |
| 13 | 3 | 00011 |
| 14 | 7 | 00111 |
| 15 | 13 | 01101 |

FIG.7

| | TABLE | | | CALCULATION RESULT | |
|---|---|---|---|---|---|
| | DENARY | BINARY (4bit) | | DENARY | BINARY (5bit) |
| 0 | 3 | 0011 | 0 | 19 | 10011 |
| 1 | 9 | 1001 | 1 | 25 | 11001 |
| 2 | 13 | 1101 | 2 | 29 | 11101 |
| 3 | 15 | 1111 | 3 | 31 | 11111 |
| | | | 4 | 31 | 11111 |
| | | | 5 | 29 | 11101 |
| | | | 6 | 25 | 11001 |
| | | | 7 | 19 | 10011 |
| | | | 8 | 13 | 01101 |
| | | | 9 | 7 | 00111 |
| | | | 10 | 3 | 00011 |
| | | | 11 | 1 | 00001 |
| | | | 12 | 1 | 00001 |
| | | | 13 | 3 | 00011 |
| | | | 14 | 7 | 00111 |
| | | | 15 | 13 | 01101 |

FIG.8

| TABLE | | 1 BIT LEVEL SHIFT | |
|---|---|---|---|
| BINARY | DENARY | BINARY | DENARY |
| 0011 | 3 | 0001 | 1 |
| 1001 | 9 | 0100 | 4 |
| 1101 | 13 | 0110 | 6 |
| 1111 | 15 | 1111 | 7 |

FIG.9

| | TABLE | | | CALCULATION RESULT | |
|---|---|---|---|---|---|
| | DENARY | BINARY (4bit) | | DENARY | BINARY (5bit) |
| 0 | 3 | 0011 | 0 | 17 | 10001 |
| 1 | 9 | 1001 | 1 | 20 | 10100 |
| 2 | 13 | 1101 | 2 | 22 | 10110 |
| 3 | 15 | 1111 | 3 | 23 | 10111 |
| | | | 4 | 23 | 10111 |
| | | | 5 | 22 | 10110 |
| | | | 6 | 20 | 10100 |
| | | | 7 | 17 | 10001 |
| | | | 8 | 15 | 01111 |
| | | | 9 | 12 | 01100 |
| | | | 10 | 10 | 01010 |
| | | | 11 | 9 | 01001 |
| | | | 12 | 9 | 01001 |
| | | | 13 | 10 | 01010 |
| | | | 14 | 12 | 01100 |
| | | | 15 | 15 | 01111 |

SINUSOIDAL WAVE OUTPUT FROM D/A CONVERTER

OUTPUT WAVEFORM OF LPF

POWER SUPPLY DEVICE AND IMAGE FORMING APPARATUS INCLUDING THE POWER SUPPLY DEVICE

BACKGROUND OF THE INVENTION

1. Field of the Invention

The present invention relates to a power supply device and an image forming apparatus including the power supply device.

2. Description of the Related Art

Conventionally, a high voltage AC power supply is required for performing a charging process such as an AC charging process. In order to control a transformer drive circuit with the high voltage AC power supply, a DC voltage is generated and fed back with a transformer output waveform signal via, for example, a rectifier and a low pass filter. However, the transformer drive circuit of an AC charger in a conventional image forming apparatus includes, for example, a half wave rectifier and a low pass filter for obtaining a feedback DC voltage used in controlling the transformer drive circuit. With such transformer drive circuit, the AC frequency for driving the transformer is low (approximately 1 kHz), it is necessary to delay the time constant of, for example, the half wave rectifier and the low pass filter. As a result, the speed for controlling the transformer drive circuit is delayed for approximately several tens of kHz. Therefore, the transformer drive circuit is unable to track (follow) a load that changes faster than the control speed of the transformer drive circuit.

FIG. 21 is a block diagram for describing an AC voltage generation part of a high voltage AC power supply device 100 for controlling an AC transformer drive according to a related art example. In FIG. 21, the high voltage AC power supply device 100 includes an IC (integrated circuit) 68. A PWM (pulse width modulation) filter 50, a differential integrator 51, a sinusoidal wave generation part 52, a triangular wave generation part 53, a comparator 54, and a switching driver part 55 constitute the IC 68. The PWM filter 50 generates a set voltage 57 in accordance with an AC_PWM signal 56 input to the PWM filter 50. The difference between the set voltage 57 and the output amplification feedback signal 67 is accumulated by the differential integrator 51.

An integrated value and a frequency setting clock AC_CLK 59 are input to the sinusoidal wave generation part 52. The sinusoidal wave generation part 52 controls amplification (frequency) in accordance with the integrated value and generates an AC signal (sinusoidal wave) 60 having a frequency controlled in accordance with the frequency setting clock AC_CLK 59. The generated AC signal 60 is also referred to as a first sinusoidal wave signal. The first sinusoidal wave signal 60 generated by the sinusoidal wave generation part 52 and a triangular wave (triangular wave signal) 69 generated by the triangular wave generation part 53 are input to the comparator 54. Based on the input, the comparator 54 generates a PWM signal 61. The comparator 54 may be, for example, a typical differential comparator. The switching drive part 55 amplifies the PWM signal 61 and outputs an amplified PWM signal 62 outside of the IC 68. The LPF (Low Pass Filter) 63 converts the amplified PWM signal 62 to a second sinusoidal wave signal having an amplified voltage compared to that of the first sinusoidal wave signal. A high voltage transformer 64 is driven by the second sinusoidal wave signal input thereto. The high voltage transformer further amplifies the second sinusoidal wave signal and outputs an AC voltage 65 having a frequency that is set in accordance with the frequency setting clock AC_CLK 59.

FIG. 20 is a schematic diagram illustrating a feedback system according to a related art example. The feedback system of FIG. 20 does not directly monitor output. More specifically, the feedback system of FIG. 20 monitors output by using a monitor coil (winding) that is provided separate from the input and output. The control speed of the feedback system of FIG. 20 is several tens of Hz due to the sinusoidal wave being lowered to DC level by the half wave rectifier 69.

As a related art example, Japanese Laid-Open Patent Publication No. 2009-122564 discloses an AC high voltage power supply device provided for the purpose of reducing size and reducing power consumption. In the disclosed AC high voltage power supply device, an input signal or an output signal of a transformer is used as a monitor signal. According to the monitor signal, feedback control is performed and a signal is input to a comparator so that a peak level of an output signal of the transformer becomes a predetermined peak level.

However, with the high voltage AC power supply device of the related art example illustrated in FIG. 21, the output signal or the input signal of the high voltage transformer 64 is rectified by the rectifier 66 and fed back as an output amplitude feedback signal 67. The frequency of an AC voltage output used in a charging process by an image forming apparatus is approximately 1 kHz. In order to change the AC voltage output to a DC voltage by rectifying the AC voltage output and feeding back the rectified signal as the output amplitude feedback signal 67, the cutoff frequency of the rectifier 66 becomes low (several tens of Hz). Thus, the speed of the entire control system of the high voltage AC power supply device 100 becomes low in correspondence with the cutoff frequency. This leads to a problem in which the control of the high voltage AC power supply device 100 cannot follow (trace) the changes of a load.

Further, the high voltage power supply device disclosed in Japanese Laid-Open Patent Publication No. 2009-122564 is also unable to follow (trace) the changes of a load.

SUMMARY OF THE INVENTION

The present invention may provide a power supply device and an image forming apparatus including the power supply device that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a power supply device and an image forming apparatus including the power supply device particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an power supply device including: an AC generation part including a sinusoidal wave generation part that generates a first sinusoidal wave signal; an integrator that integrates a difference between the first sinusoidal wave signal and a feedback signal, a triangular wave generation part that generates a triangular wave signal, a comparator that compares an output of the integrator and the triangular wave signal and outputs a PWM signal, a switching drive part that amplifies the PWM signal and outputs an amplified PWM signal, a filter that converts the amplified PWM signal into a second sinusoidal wave signal, a transformer that increases a voltage of the second sinusoidal wave signal and outputs an AC voltage, and a voltage divider that divides the AC voltage and generates the feedback signal; and a DC generation part that generates a DC voltage; wherein the power supply device is configured to superimpose the AC voltage and the DC voltage and output a superimposed voltage.

Other objects, features and advantages of the present invention will become more apparent from the following detailed description when read in conjunction with the accompanying drawings.

BRIEF DESCRIPTION OF THE DRAWINGS

FIG. 2B is a schematic diagram illustrating a waveform of each terminals of an AC voltage generation part according to an embodiment of the present invention;

FIG. 3 is a schematic diagram illustrating an exemplary configuration of a sinusoidal wave generation part that generates a first sinusoidal wave with a D/A converter according to an embodiment of the present invention;

FIG. 4 is an example of a table including data corresponding to signals of a first sinusoidal wave generated by a sinusoidal wave generation part according to an embodiment of the present invention;

FIG. 7 is another example of a table illustrated together with calculation results obtained by calculation based on the table;

FIG. 8 is another example of a table that is used in calculation for changing the amplitude of a first sinusoidal wave according to an embodiment of the present invention;

FIG. 9 is another example of a table illustrated together with calculation results obtained by calculation based on the table;

DETAILED DESCRIPTION OF THE PREFERRED EMBODIMENTS

Figure 1:
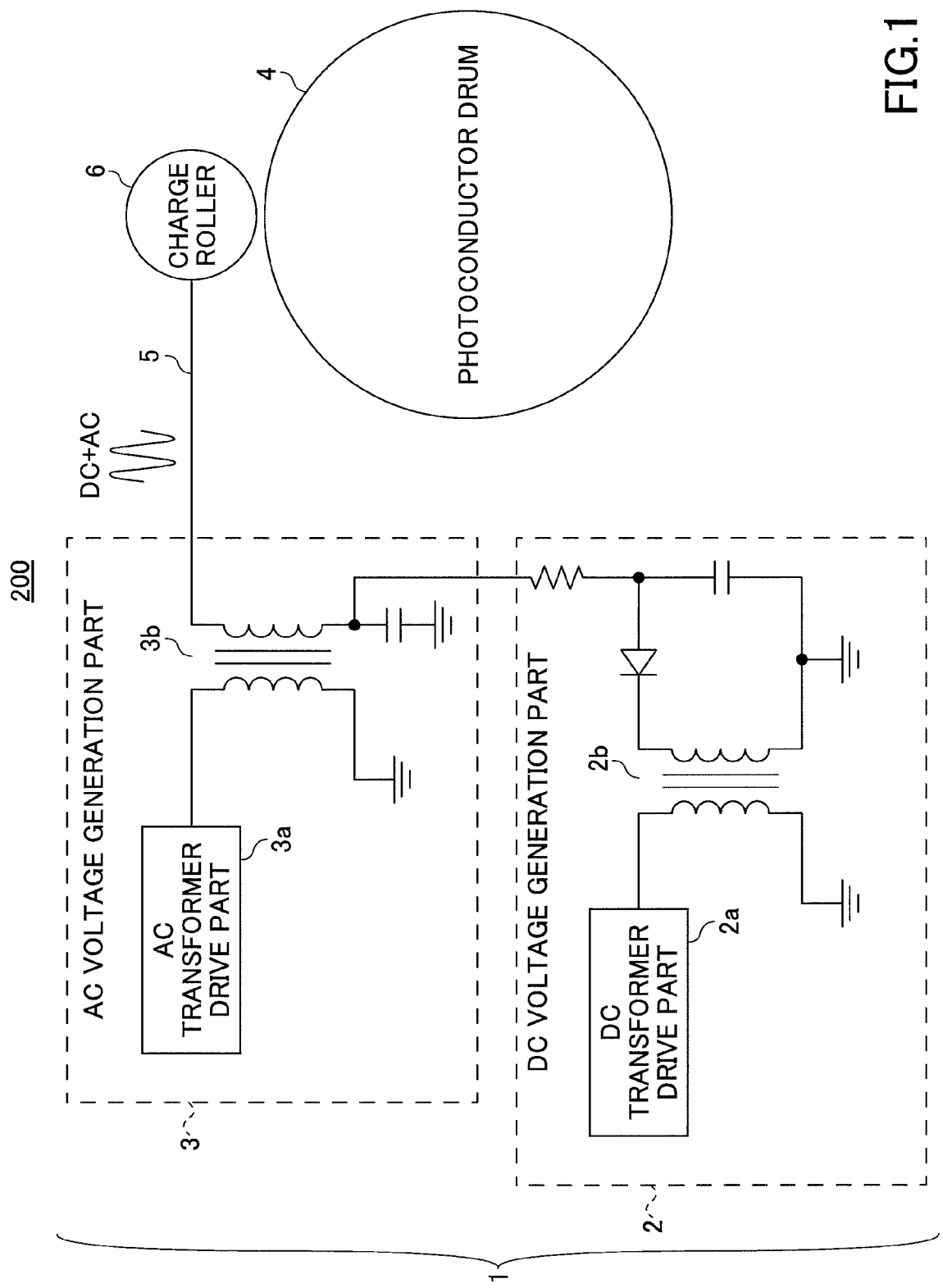
FIG. 1 is a schematic diagram illustrating a high voltage power supply device according to an embodiment of the present invention.

FIG. 1 is a schematic diagram illustrating a high voltage power supply device (hereinafter also simply referred to as "power supply device") 1 used as a charge device of an image forming apparatus 200 according to an embodiment of the present invention. It is to be noted that the image forming apparatus 200 may be an image forming apparatus configured to form a monotone image(s), a color image(s), or both. The power supply device (hereinafter also referred to as "charge device") 1 according to an embodiment of the present invention includes a DC voltage generation part 2 for generating DC voltage and an AC voltage generation part 3 for generating AC voltage. The DC voltage generation part 2 generates a DC voltage to be used for charging a photoconductor drum 4. The AC voltage generation part 3 generates a sinusoidal wave having a frequency corresponding to a printing condition (e.g., printing speed) of the image forming apparatus 200 and generates an AC voltage to be superimposed with the DC voltage generated by the DC voltage generation part 2. The high power voltage power supply device 1 superimposes the AC voltage and the DC voltage and outputs a superimposed voltage 50 to the charge roller 6. By applying the superimposed voltage 50 to the charge roller 6, the photoconductor drum 4 can be uniformly charged. Because the charge roller 6 and the photoconductor drum 4 do not have an ideal circular shape, the distance between the charge roller 6 and the photoconductor drum 4 may be inconsistent depending on position. This inconsistency may cause the size of the load of the AC transformer 3b and the DC transformer 2b to change according to time. In controlling the driving of an AC transformer with a power supply device according to a related art example, the power supply device of the related art example is unable to follow (trace) the distortion of a sinusoidal waveform caused by change of load because the power supply device of the related art example has a slow control speed. The AC voltage generation part 3 according to an embodiment of the present invention requires no half wave rectifier or a low pass filter having a slow time constant for obtaining a DC voltage. Thus, control speed of the power supply device 1 increased. Therefore, the power supply device 1 can follow changes of load owing to the increased control speed.

Next, the image forming apparatus 200 according to an embodiment of the present invention is described in further detail with reference to FIGS. 22 and 23.

Figure 22:
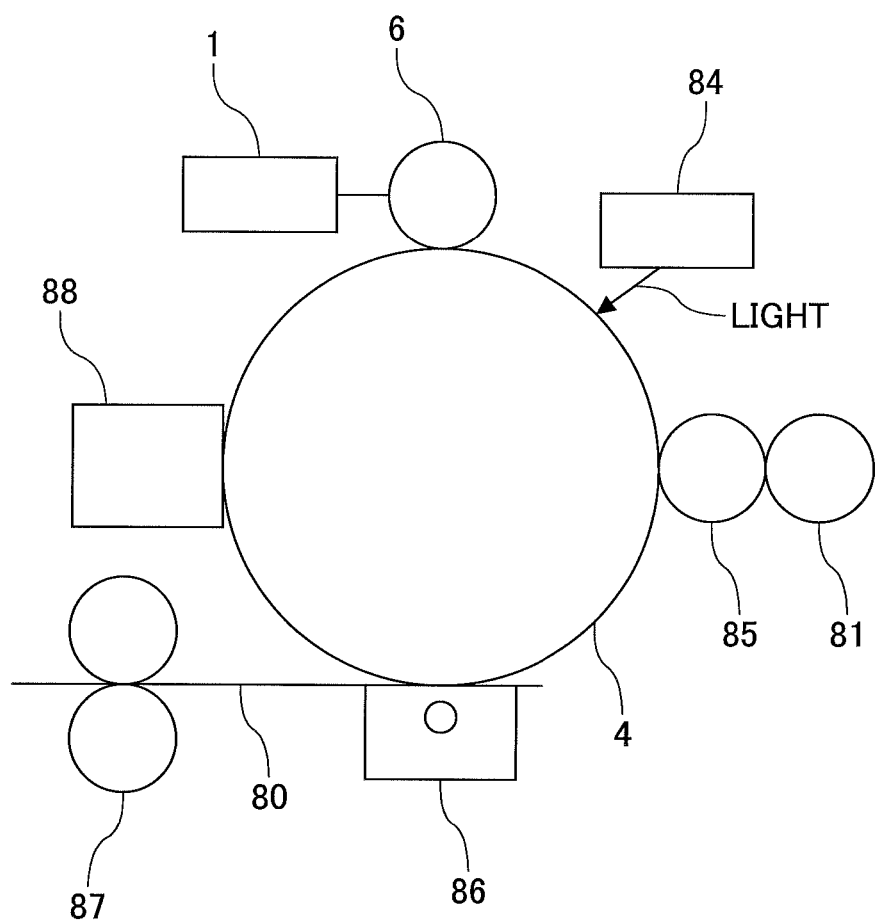
FIG. 22 is a schematic diagram illustrating an image forming apparatus according to an embodiment of the present invention.

FIG. 22 is a schematic diagram illustrating an image forming apparatus 200A according to an embodiment of the present invention. The image forming apparatus 200A includes components, such as, the power supply device 1, the photoconductor drum 4, the charge roller 6, a toner cartridge 81, an exposure device (light exposing device) 84, a developer roller 85, a transfer device 86, a fixing roller 87, a cleaning case 88. In the image forming apparatus 200A of FIG. 22, the charge roller 6, the power supply device 1, the exposure device 84, the developer roller 85, the toner cartridge 81, and the cleaning case 88 are provided at the periphery (target scanning surface) of the photoconductor drum 4. The charge roller 6 is for charging the photoconductor drum 4 to a high voltage. The power supply device 1 is for supplying electric power to the charge roller 6. The exposure device 84 is for irradiating light to the photoconductor drum 4 for forming an electrostatic latent image on the surface of the photoconductor drum 4. The developer roller 85 is for developing (visualizing) the electrostatic latent image by adhering charged toner to the electrostatic latent image. The toner cartridge 81 is for supplying toner to the developer roller 85. The cleaning case 88 is for removing residual toner remaining on the surface of the photoconductor drum 4. The transfer device 86 is for transferring toner to a sheet of paper (recording medium) 80. The fixing roller 87 is for fixing the toner onto the paper 80 and discharging the paper 80.

Figure 23:
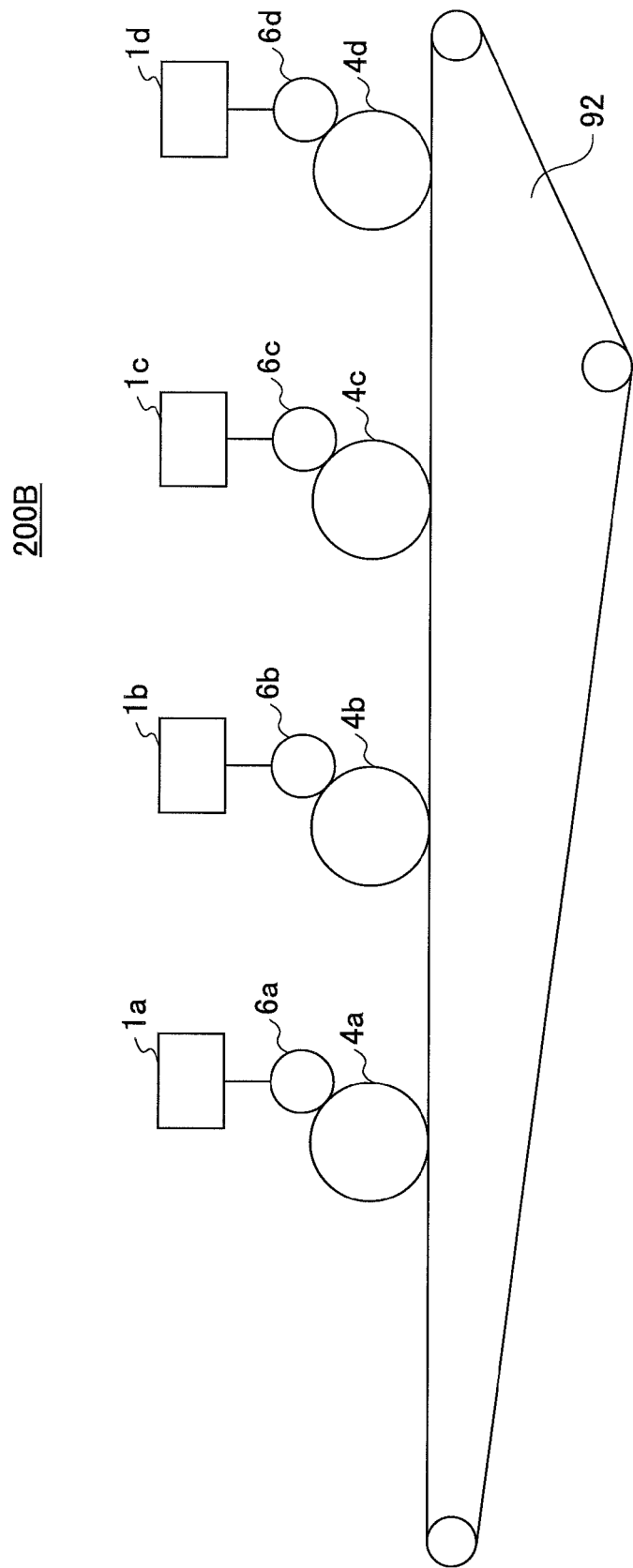
FIG. 23 is a schematic diagram illustrating an image forming apparatus (color image forming apparatus) according to another embodiment of the present invention.

FIG. 23 is a schematic diagram illustrating an image forming apparatus 200B according to another embodiment of the present invention. The image forming apparatus 200B is a tandem color apparatus including plural photoconductor drums 4a-4d. The plural photoconductor drums 4a-4d correspond to colors of cyan, magenta, yellow, and black. In this embodiment, the image forming apparatus 200B uses an intermediate transfer method in which toner is not directly transferred to the paper 80. Instead, toner of each color is first transferred to an intermediate transfer belt 92 and then transferred at once from the intermediate transfer belt 92 to the paper 80. The image forming apparatus 200B includes plural power supply devices 1a, 1b, 1c, 1d and plural charge rollers 6a, 6b, 6c, 6d that are provided in correspondence with the colors of cyan, magenta, yellow, and black.

Figure 2A:
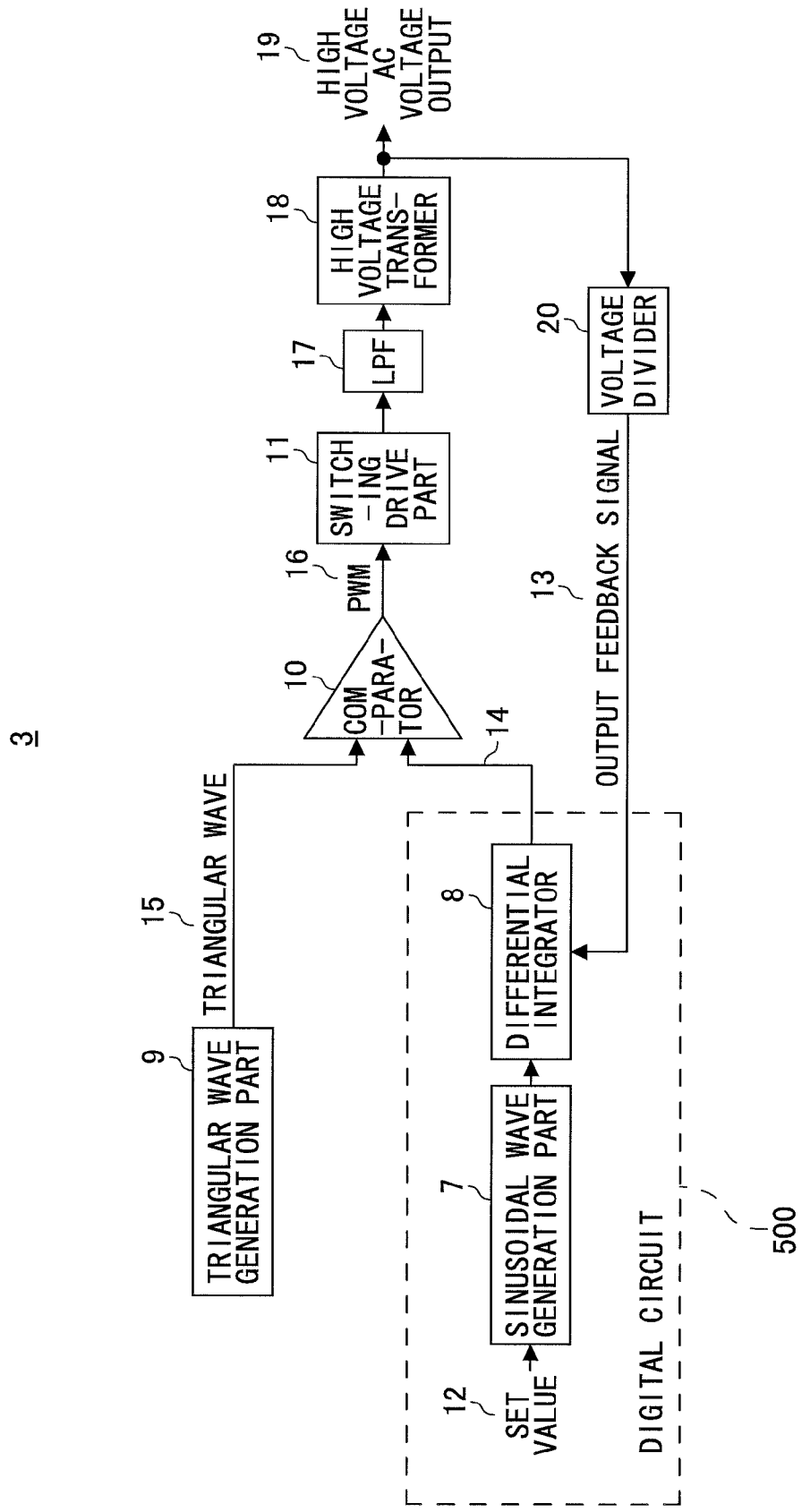
FIG. 2A is a block diagram for describing an AC voltage generation part of a power supply device according to a first embodiment of the present invention.

FIG. 2A is a block diagram for describing the AC voltage generation part 3 of the power supply device 1 according to a first embodiment of the present invention. FIG. 2B is a schematic diagram illustrating the waveform of each of the terminals of the AC voltage generation part 3 according to an embodiment of the present invention. The AC voltage generation part 3 according to the first embodiment of the present invention includes, for example, a sinusoidal wave generation part 7, a differential integrator 8, a triangular wave generation part 9, a comparator 10, a switching drive part 11, an LPF (Low Pass Filter, filter circuit) 17, a high voltage transformer 18, and a voltage divider 20. The sinusoidal wave generation part 7 is for generating a first sinusoidal waveform signal having a predetermined amplitude and frequency. The predetermined amplitude and frequency are set in accordance with a set value (predetermined value) 12. The differential integrator 8 is for integrating a difference between the first sinusoidal waveform signal generated by the sinusoidal wave generation part 7 and an output feedback signal (final output signal) 13 generated (fed back) by the voltage divider 20. The triangular wave generation part 9 is for generating a triangular wave (triangular wave signal) 15. The comparator 10 is for comparing the output of the differential integrator 8 and the triangular wave generated by the triangular wave generation part 9. The switching drive part 11 is for amplifying a PWM (Pulse Wave Modulation) signal 16 output from the comparator 10. The LPF 17 is for converting the PWM signal amplified by the switching drive part 11 to a second sinusoidal waveform signal. The high voltage transformer 18 is for increasing (boosting) the voltage of the second sinusoidal waveform signal to a high AC voltage 19. The voltage divider 20 is for dividing the high AC voltage 19 output from the high voltage transformer 18 and generating the output feedback signal 13. As described above, the power supply device 1 includes the DC voltage generation part 2 for generating DC voltage (which is to be the charge potential of the charge device 1). The high AC voltage 19 generated by the AC voltage generation part 3 and the DC voltage generated by the DC voltage generation part 2 are superimposed and output from the power supply device 1.

The amplitude and the frequency of the first sinusoidal waveform signal generated by the sinusoidal wave generation part 7 may be determined by the set value 12 as described below. For example, the amplitude of the first sinusoidal waveform signal may be determined in view of factors such as the condition of the photoconductor drum 4 or the gap (distance) between the charge roller 6 and the photoconductor drum 4. In a case where electric discharge occurs between the charge roller 6 and the photoconductor drum 4 during a charge process, the electric current that flows during the charge process is be controlled so that the value of the electric current (electric current value) is constant. Further, in a case where the electric current value is changed by, for example, degradation of the photoconductor drum 4 or changing of the gap between the photoconductor drum 4 and the charge roller 6, the amplitude of the first sinusoidal waveform signal is to be controlled so that the electric current value is constant. It is to be noted that the frequency of the first sinusoidal waveform signal changes in accordance with printing speed. For example, the frequency of the first sinusoidal waveform signal becomes faster as printing speed increases. Further, the frequency of the first sinusoidal waveform signal becomes slower as printing speed increases and becomes slower as printing speed decreases.

In the following description with reference to FIGS. 2A and 2B, it is to be noted that the sinusoidal wave output from the sinusoidal wave generation part 7 is referred to as the first sinusoidal wave, the sinusoidal wave output from the voltage divider 20 (i.e. sinusoidal wave of output feedback signal 13) is referred to as the second sinusoidal wave, the sinusoidal wave output from the LPF 17 is referred to as the third sinusoidal wave, and the sinusoidal wave output from the high voltage transformer 18 is referred to as the fourth sinusoidal wave.

In the AC voltage generation part 3 illustrated in FIG. 2A, a signal of the first sinusoidal wave is generated by the sinusoidal wave generation part 7 having an amplitude and a frequency are set in accordance with the set value (predetermined value) 12. For example, the amplitude and the frequency set in accordance with the predetermined value may be transmitted by serial communication to the sinusoidal wave generation part 7. A difference between the signal of the first sinusoidal wave and a signal of the fourth sinusoidal wave (output feedback signal) is accumulated by the differential integrator 8. An output signal 14 output from the differential integrator 8 and the triangular wave 15 generated by the triangular wave generation part 9 are input to the comparator 10. Based on the input to the comparator 10, the comparator 10 generates the PWM signal 16. The comparator 10 may be, for example, a typical differential comparator.

Then, the switching drive part 11 amplifies the PWM signal 16 and outputs the amplified PWM signal. Then, the LPF 17 converts the amplified PWM signal to a signal of the third sinusoidal wave. That is, the LPF 17 further amplifies the voltage of the amplified PWM signal, to thereby output the signal of the third sinusoidal wave having a voltage greater than the voltage of the signal of the first sinusoidal wave. Then, the high voltage transformer 18 is driven by the signal of the third sinusoidal wave output from LPF 17. The high voltage transformer 18 further amplifies the signal of the third sinusoidal wave and generates a high AC voltage having a frequency complying with the frequency setting clock AC_CLK (signal of the fourth sinusoidal wave). Then, the high AC voltage 19 is output from the AC voltage generation part 3. In addition, the voltage divider 20 divides the high AC voltage 19 and outputs (feeds back) the output amplitude feedback signal 13 (signal of the second sinusoidal wave) to the differential integrator 8. In this embodiment, the signal of the fourth sinusoidal wave is input to the voltage divider 20. Alternatively, the signal of the third sinusoidal wave may be input to the differential integrator 8 to be used as a feedback signal.

By using a sinusoidal waveform as a reference waveform, the overall control speed of the power supply device 1 can be accelerated to a speed faster than the frequency of the sinusoidal wave. Therefore, even where there is a change of load of the power supply device 1, the controls of the power supply device 1 can respond to the change. Accordingly, a sinusoidal wave can be steadily applied to the load. Thus, by steadily applying the sinusoidal wave to the load, the photoconductor drum 6 can be uniformly charged. As a result, an image can be formed hardly with any inconsistent density.

FIG. 3 is a schematic diagram illustrating an exemplary configuration of the sinusoidal wave generation part 7 that generates a first sinusoidal wave 23 with a D/A converter 22 according to an embodiment of the present invention. In this embodiment, the sinusoidal wave generation part 7 and the differential integrator 8 constitute a digital circuit 500. In this embodiment, the sinusoidal wave generation part 7 includes a table 21 and a D/A converter 22. Plural bit strings (bit patterns) corresponding to signals of the first sinusoidal wave 23 are stored in the table 21. The D/A converter 22 sequentially reads out bit strings from the table 21 and converts the read out bit string into analog data signals. In this embodiment, the table 21 contains data of 5 bits×16, and the D/A converter 22 is configured to output 5 bit data. In this embodiment, a single cycle of the first sinusoidal wave 23 generated by the sinusoidal wave generation part 7 is equivalent to 16 clock cycles.

FIG. 4 is an example of the table 21 including data corresponding to the signals of the first sinusoidal wave 23 generated by the sinusoidal wave generation part 7. The data retained in the table 21 is transmitted to the D/A converter 22 in synchronization with the clock 24 that defines the cycle of the first sinusoidal wave 23. The D/A converter 22 outputs data transmitted from the table 21 in synchronization with the clock 24. For example, data "11111" is transmitted in a case of clock 3, and data "10011" is transmitted is a case of clock 7 as illustrated in FIG. 4. Accordingly, D/A converter 22 of the sinusoidal wave generation part 7 outputs the first sinusoidal wave 23 as illustrated in FIG. 2B.

Figure 5:
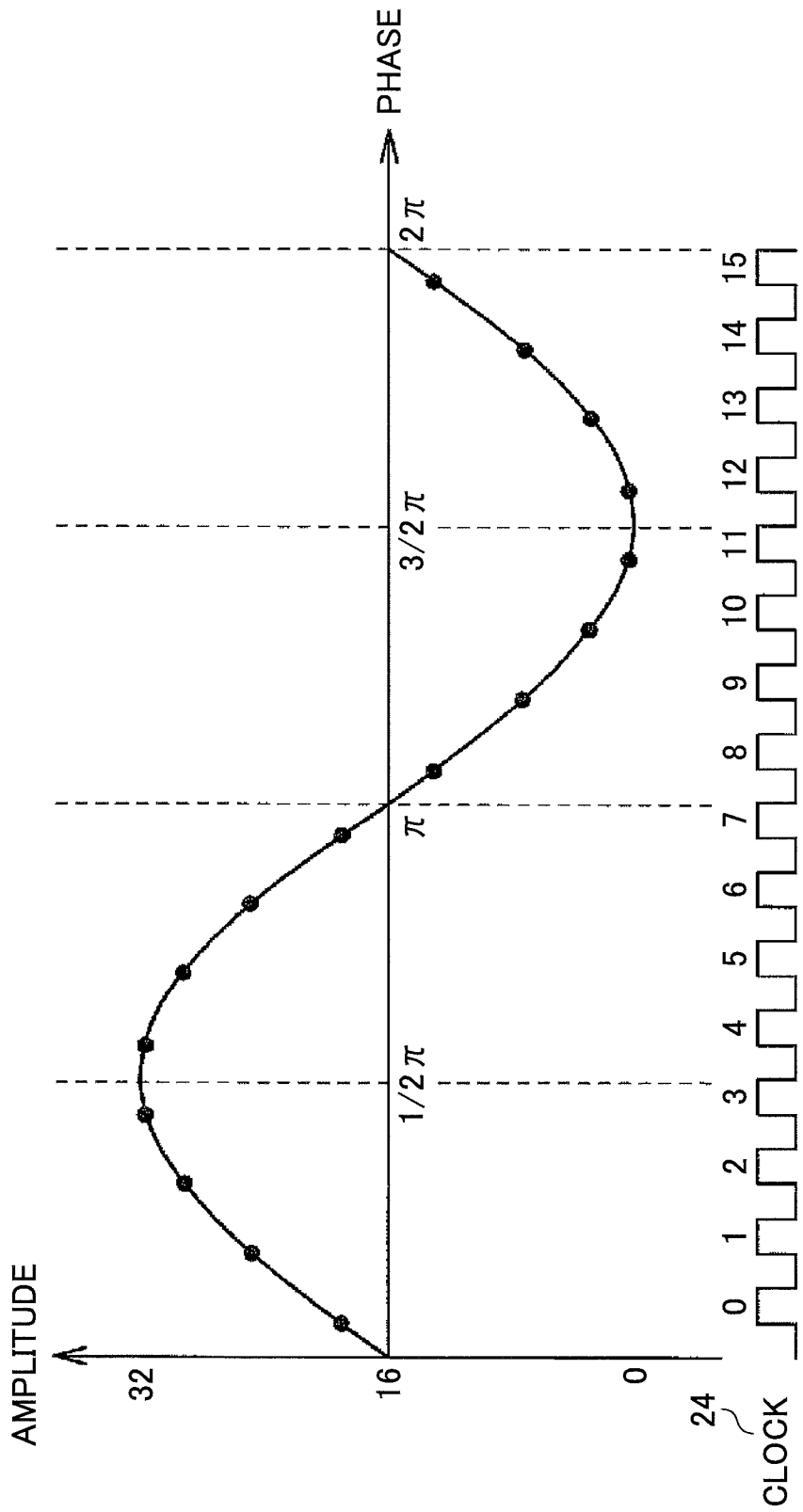
FIG. 5 is a schematic diagram for describing the output of a D/A converter according to an embodiment of the present invention.

FIG. 5 is a schematic diagram for describing the output of the D/A converter 22 according to an embodiment of the present invention. In this embodiment, a sinusoidal wave signal having a sinusoidal wave shape illustrated in FIG. 5 is output from the D/A converter 22 by converting the data of the table 21 (code) in synchronization with the rise of the clock 24. The frequency of the sinusoidal wave 23 can be adjusted by adjusting the frequency of the clock 24.

Figure 6:
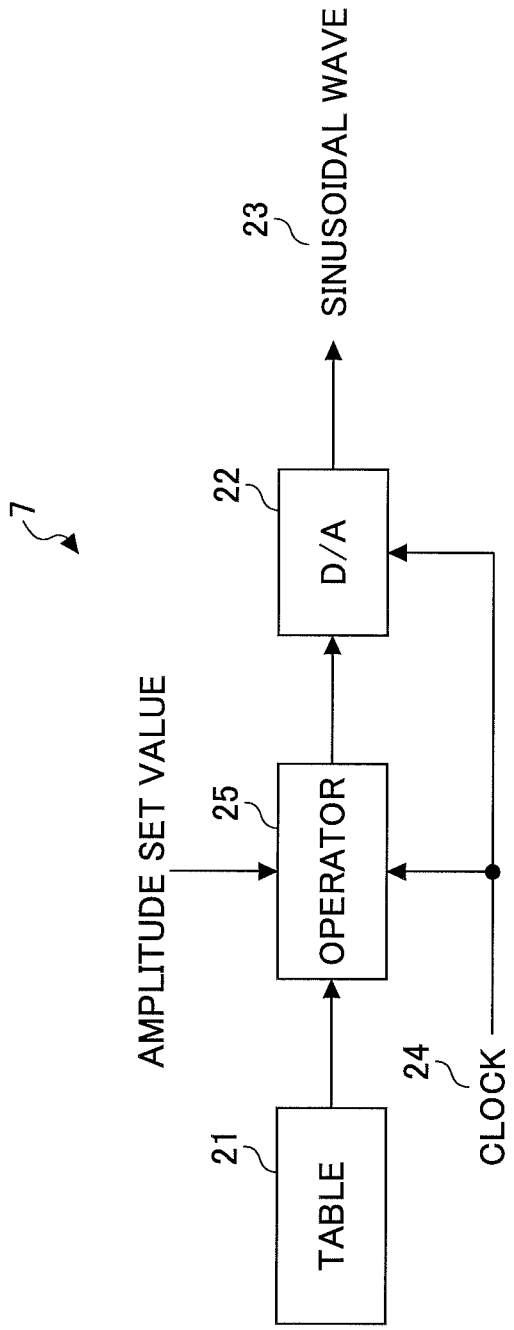
FIG. 6 is a schematic diagram for describing a method of setting the amplitude of a sinusoidal wave by using an operator according to an embodiment of the present invention.

FIG. 6 is a schematic diagram for describing a method of setting the amplitude of the sinusoidal wave 23 by using an operator 25 according to an embodiment of the present invention. In this embodiment, the sinusoidal wave generation part 7 includes the table 21, the operator 25, and the D/A converter 22. In this embodiment, bit strings (bit patterns) corresponding to a ¼ cycle of the signal of the first sinusoidal wave 23 are stored in the table 21. The operator 25 calculates a bit string of a subsequent cycle based on the bit strings read out from the table 21. The D/A converter 22 converts the calculation result of the operator 25 to analog data signals. In this embodiment, the table 21 contains data of 4 bits×4, and the D/A converter 22 is configured to convert 5 bit data. In this embodiment, a single cycle of the first sinusoidal wave 23 generated by the sinusoidal wave generation part 7 is equivalent to 16 clock cycles. In the following, the first sinusoidal wave 23 is described by dividing the first sinusoidal wave 23 in four blocks in correspondence with each ½π phase (i.e. four blocks in correspondence with four clock cycles each).

In order to divide the first sinusoidal wave in correspondence with four clock cycles each, a counter is required. Accordingly, a counter is installed inside the operator 25. Data corresponding to the first four clock cycles are read out from the table 21 in an ascending order. The read out data is added with 16 (10000) and input as a code (i.e. data to be converted) to the D/A converter 22. Then, data of the next four clock cycles are read out from the table 21 in a descending order. The read out data is added with 16 (10000) and input as a code (i.e. data to be converted) to the D/A converter 22. Then, data of the next four clock cycles are read out from the table 21 in an ascending order. The read out data is subtracted from 16 (10000) and input as a code (i.e. data to be converted) to the D/A converter 22. Then, data of the last four clock cycles are read out from the table 21 in a descending order. The read out data is subtracted from 16 (10000) and input as a code (i.e. data to be converted) to the D/A converter 22.

FIG. 7 is another example of the table 21 illustrated together with calculation results obtained by calculation based on the table 21.

In this example, signals of the first sinusoidal wave 23 are generated from the 5 bit×16 data. Because a vast amount of data would be required if the number of bits or the amount of data input to the D/A converter 22 is increased, it is preferable to generate data equivalent to a single cycle based on a ¼ cycle of data. Thereby, the sinusoidal wave generation part 7 can be fabricated having a small circuit size.

FIG. 8 is another example of a table that is used in calculation for changing the amplitude of the first sinusoidal wave 23 according to an embodiment of the present invention.

FIG. 9 is an example of the table 8 illustrated together with calculation results obtained by calculation based on the table 8. In this example, the amplitude of the signal of the first sinusoidal wave 23 is changed based on the amplitude of the set value 12 (see, for example, FIG. 6). More specifically, in this example, the amplitude of the signal of the sinusoidal wave is reduced to ½ the amplitude indicated in the table 8. By shifting the binary values (indicated on the left side of the table 21 in FIG. 8) 1 bit to the right, 1 bit level shift values (indicated on the right side of the table 21 in FIG. 8) can be obtained. Then, by performing the same calculation described with FIG. 7 on the 1 bit level shift values, calculation results illustrated in FIG. 9 can be obtained.

Figure 10:
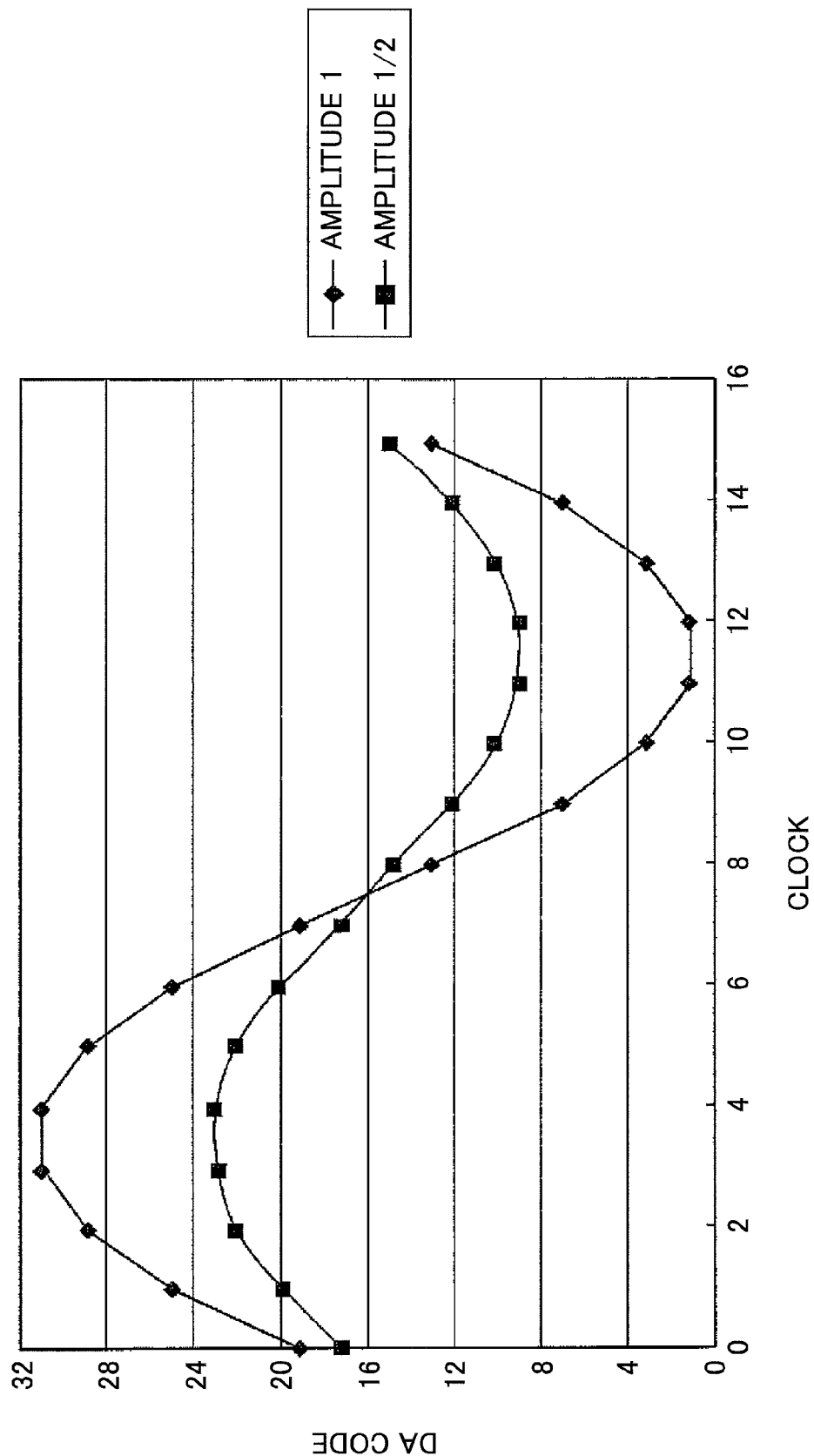
FIG. 10 is a graph illustrating a waveform of a signal output from a D/A converter based on the tables of FIGS. 4 and 9.

FIG. 10 is a graph illustrating the waveform of the signal output from the D/A converter 22 based on the tables of FIGS.

4 and 9. In FIG. 10, the line having rhombus-shaped points indicates the waveform of amplitude 1 where the values indicated in the table 21 of FIG. 4 is used, and the line having square-shaped points indicates the waveform of amplitude ½ where each of the values indicated in the table 21 of FIG. 4 is reduced to ½.

Figure 11:
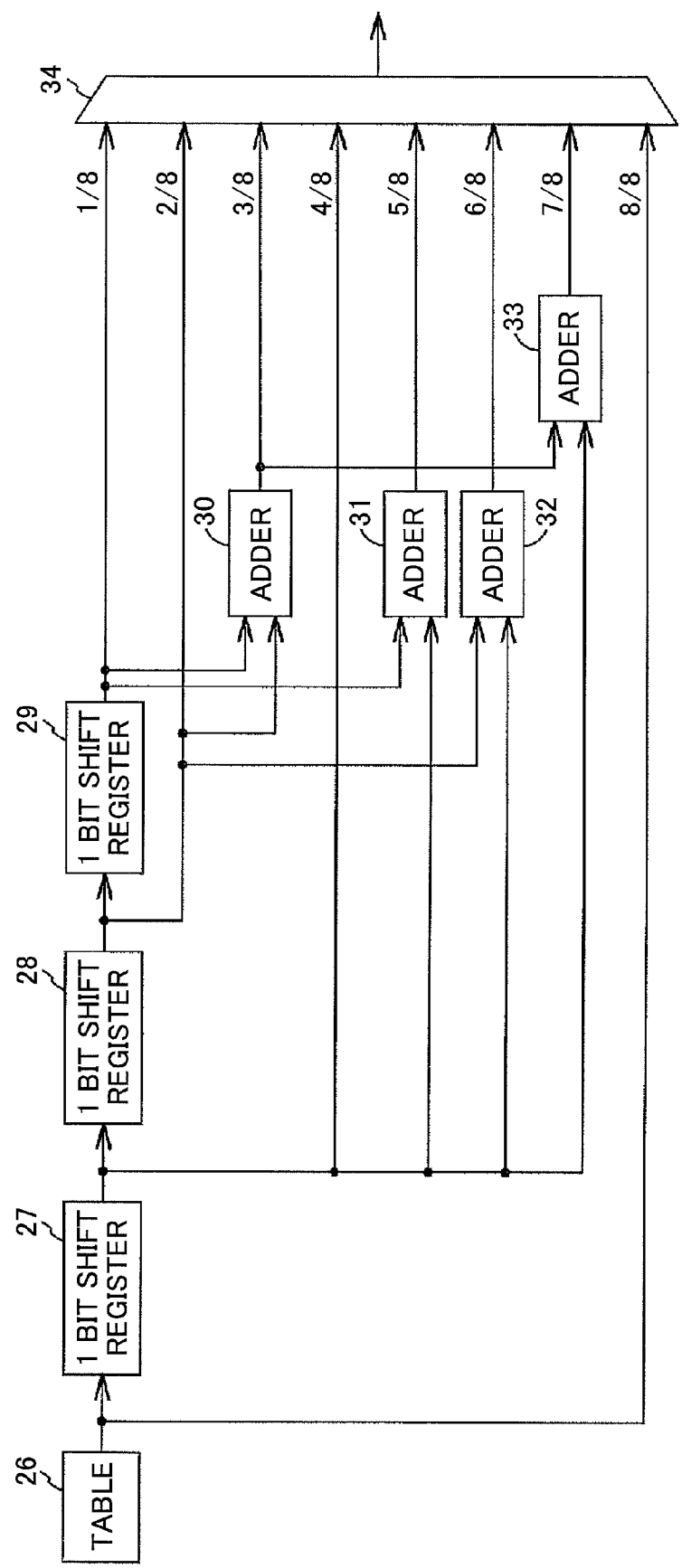
FIG. 11 is a schematic diagram illustrating an example of an operation circuit included in a sinusoidal wave generation part for changing the amplitude of a sinusoidal wave based on the amplitude of a set value according to an embodiment of the present invention.

FIG. 11 is a schematic diagram illustrating an example of an operation circuit included in the sinusoidal wave generation part 7 for changing the amplitude of a sinusoidal wave based on the amplitude of the set value 12 according to an embodiment of the present invention. FIG. 11 illustrates a circuit that uses 1 bit shift registers 27, 28, 29 and adders 30, 31, 32, 38 for adjusting 4 bit values stored in a table 26 according to an embodiment of the present invention. In this example, the 4 bit values stored in the table 26 are adjusted in units of ⅛. That is, by passing a value of the table 26 through a single 1 bit shift register 27, the value can be reduced to ½. In a case where a value of the table 26 is passed through two 1 bit shift registers 27, 28, the value can be reduced to ¼. In a case where a value of the table 26 is passed through the 1 bit shift registers 27, 28, 29 the value can be reduced to ⅛. Accordingly, a sinusoidal wave signal having its amplitude changed is output from a gate circuit 34 of the sinusoidal wave generation part 7.

Figure 12:
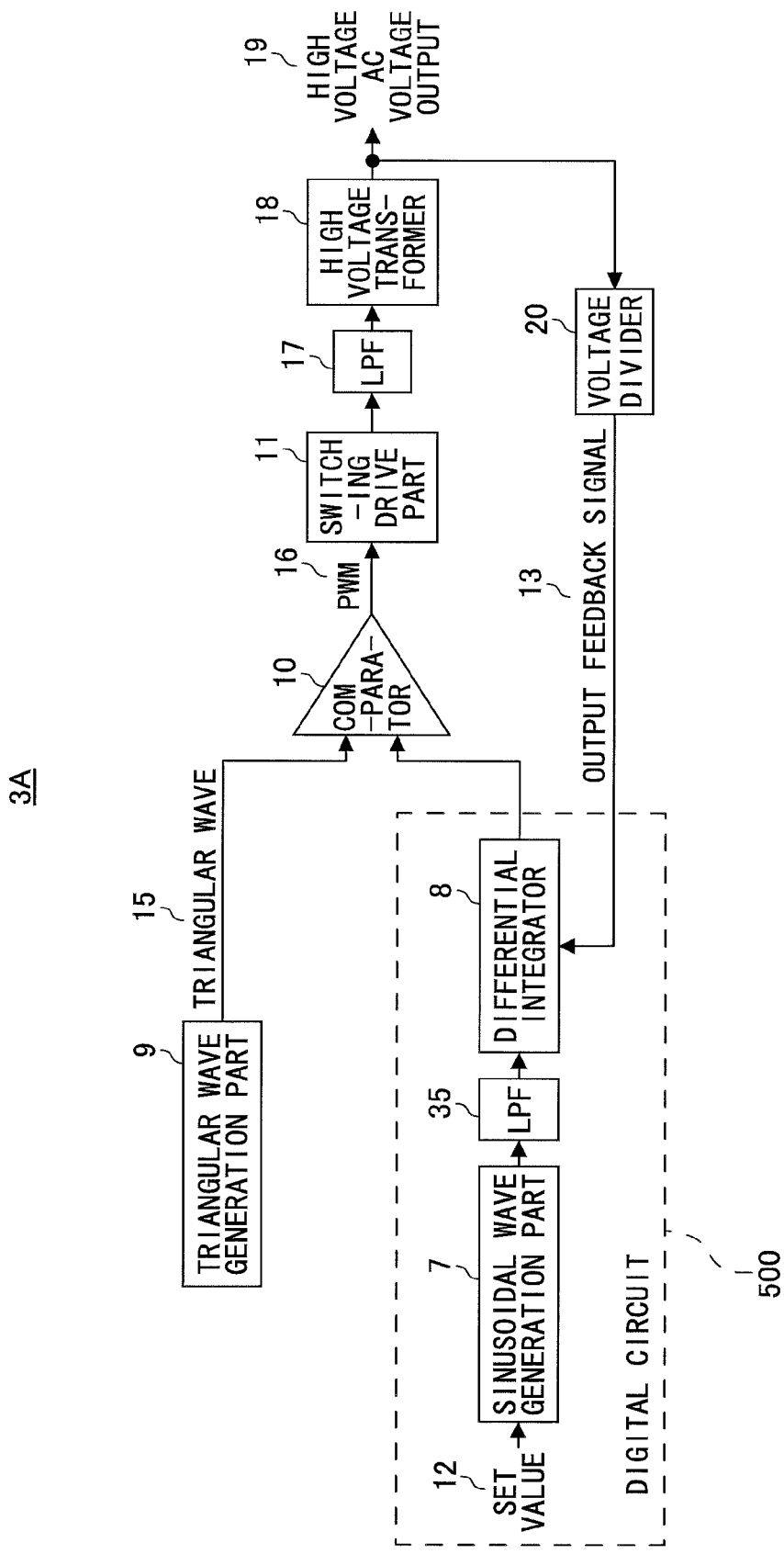
FIG. 12 is a block diagram for describing an AC voltage generation part of a power supply device according to a second embodiment of the present invention.

FIG. 12 is a block diagram for describing an AC voltage generation part 3A of the power supply device 1 according to a second embodiment of the present invention. In FIG. 12, like components are denoted with like reference numerals as those of FIG. 2A and are not described in further detail. The difference between the AC voltage generation part 3 of FIG. 2A and the AC voltage generation part 3A of FIG. 12 is that a LPF 35 is provided after the sinusoidal wave generation part 7. In a case where the digital circuit and the D/A converter 22 are provided in the sinusoidal wave generation part 7, a glitch noise may interfere at a timing when the D/A converter 22 is switched. Accordingly, the LPF 35 is provided after the sinusoidal generation part 7 for preventing the interference of the glitch noise.

Figure 13:
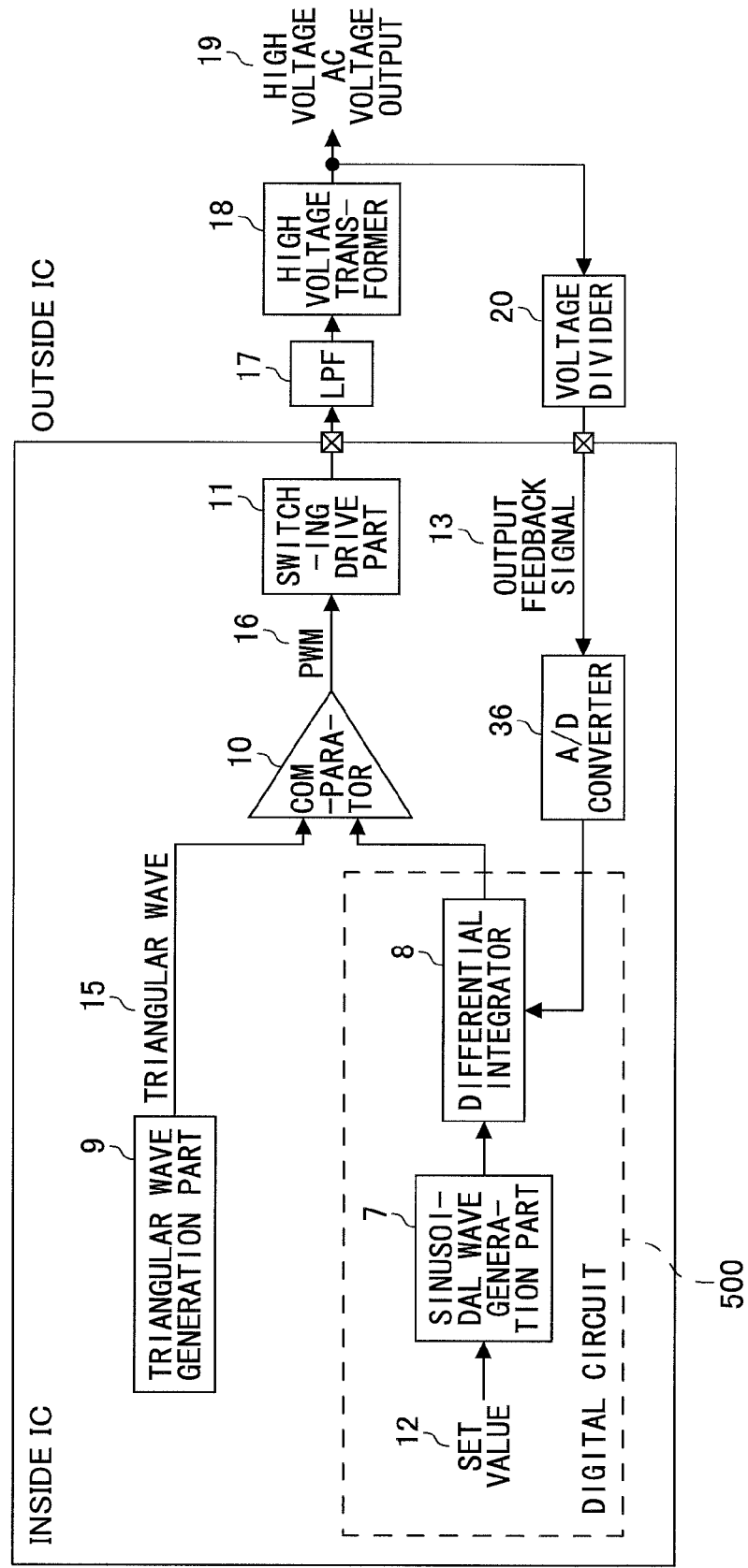
FIG. 13 is a block diagram for describing an AC voltage generation part of a power supply device according to a third embodiment of the present invention.

FIG. 13 is a block diagram for describing an AC voltage generation part 3B of the power supply device 1 according to a third embodiment of the present invention. In FIG. 13, like components are denoted with like reference numerals as those of FIG. 2A and are not described in further detail. In the AC voltage generation part 3B of the third embodiment, the sinusoidal wave generation part 7 and the differential integrator 8 constitute the digital circuit 500, and an A/D converter 36 is provided at the output of the voltage divider 20. Accordingly, the output feedback signal 13 is converted to digital data by the A/D converter 36 and fed back to the differential integrator 8 of the digital circuit 500.

In a case supposing that the differential integrator 8 constitutes an analog circuit, circuit characteristics become inconsistent when an RC is used inside the IC. Further, because an RC requires a large space, the number of input/output pins is to be increased in a case where the RC is positioned outside of the IC. Accordingly, increase of RC size, inconsistency of circuit characteristics, and increase of input/output pins can be prevented by having the differential integrator 8 constitute a digital circuit 500 as in the fourth embodiment of the present invention.

Figure 14:
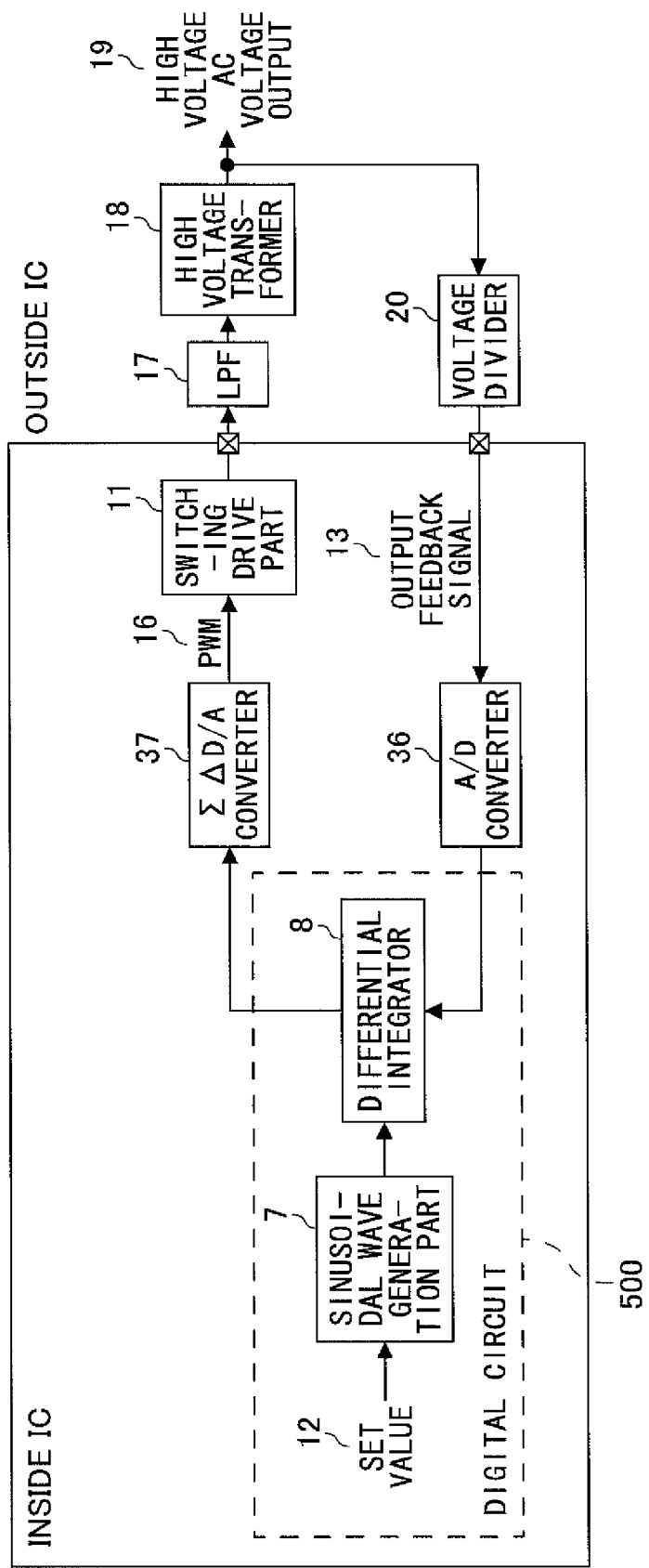
FIG. 14 is a block diagram for describing an AC voltage generation part of a power supply device according to a fourth embodiment of the present invention.

FIG. 14 is a block diagram for describing an AC voltage generation part 3C of the power supply device 1 according to a fourth embodiment of the present invention. In FIG. 14, like components are denoted with like reference numerals as those of FIG. 2A and are not described in further detail.

In this embodiment, a $\Sigma\Delta$ D/A converter 37 generates the PWM signal 16. In this embodiment, digital data output from the differential integrator 8 are input to the $\Sigma\Delta$ D/A converter 37. By using the $\Sigma\Delta$ D/A converter 37, the cutoff frequency of the PWM signal 16 can be lowered. By lowering the cutoff frequency, the size of the inductor (L) and the capacitor (C) used for the low pass filter 17 can be reduced. As a result, manufacturing cost can be reduced.

Figure 15:
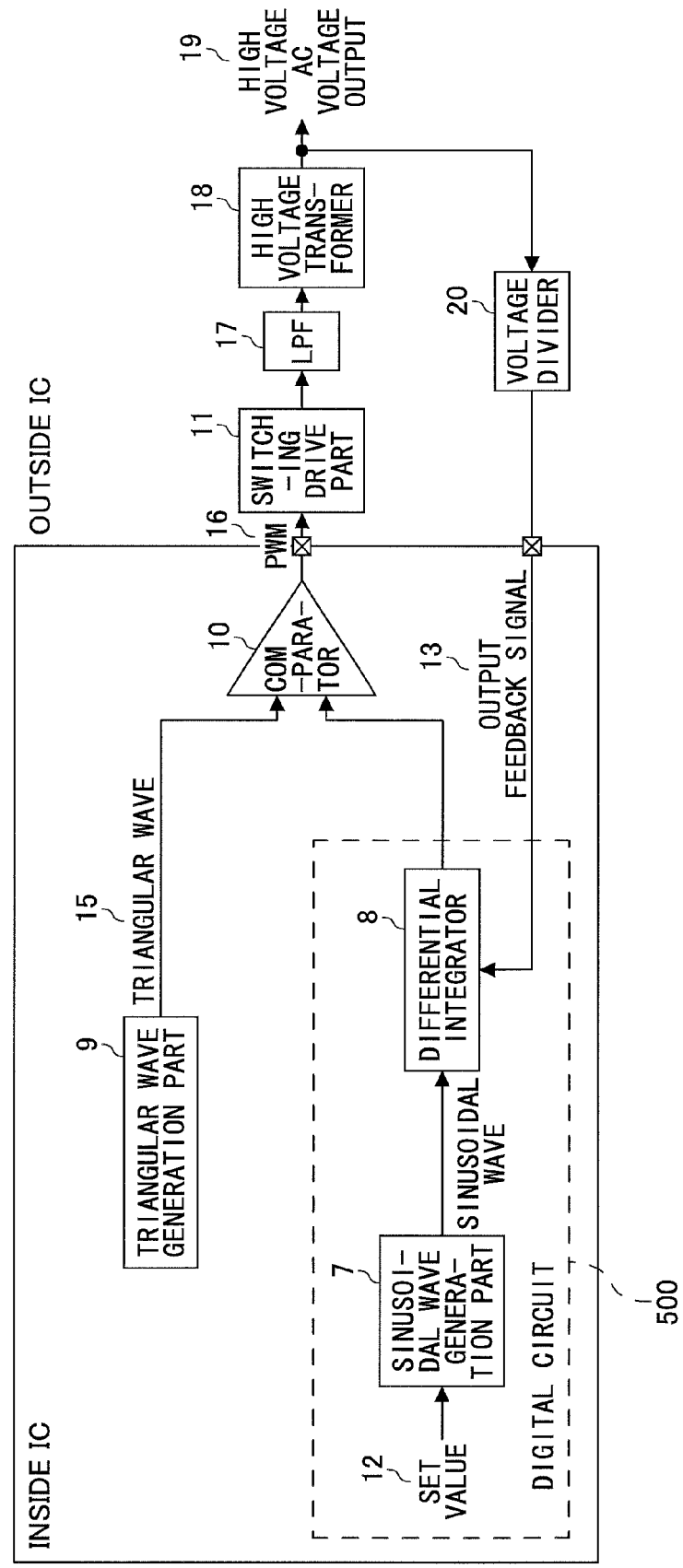
FIG. 15 is a block diagram for describing an AC voltage generation part of a power supply device according to a fifth embodiment of the present invention.

FIG. 15 is a block diagram for describing an AC voltage generation part 3D of the power supply device 1 according to a fifth embodiment of the present invention. In FIG. 15, like components are denoted with like reference numerals as those of FIG. 2A and are not described in further detail.

In this embodiment, the switching drive part 11 is an external component that is mounted from the outside of the IC of the AC voltage generation part 3D. In this embodiment, the switching drive part 11 includes a P-channel transistor and an N-channel transistor. Each of the transistors has an on-resistance of approximately a few ohms ($\Omega$) and allows few hundred mA of electric current to flow whenever switching is performed. In a case where the switching drive part 11 is mounted to the outside, the gate (base) signals of the transistor are the output of the IC of the AC voltage generation part 3D. The switching drive part 11 can be thermally separated from the other components of the AC voltage generation part 3D by positioning the switching drive part 11 closer to the high voltage transformer 18 than the vicinity of the IC of the AC voltage generation part 3D.

Even in a case where the switching driving part 11 has a large amount of heat and the frequency of the sinusoidal wave signals is fast, the IC of the AC voltage generation part 3D can be prevented from being damaged by the heat. In other words, because the load of the AC power supply is a capacitive load, consumption of electric current increases as the frequency of the sinusoidal wave signals become faster. For example, the consumption of electric current becomes 3 times when the frequency of the sinusoidal wave signal is 3 kHz compared to the consumption of electric current in a case where the frequency of the sinusoidal wave signal is 1 kHz.

Figure 16:
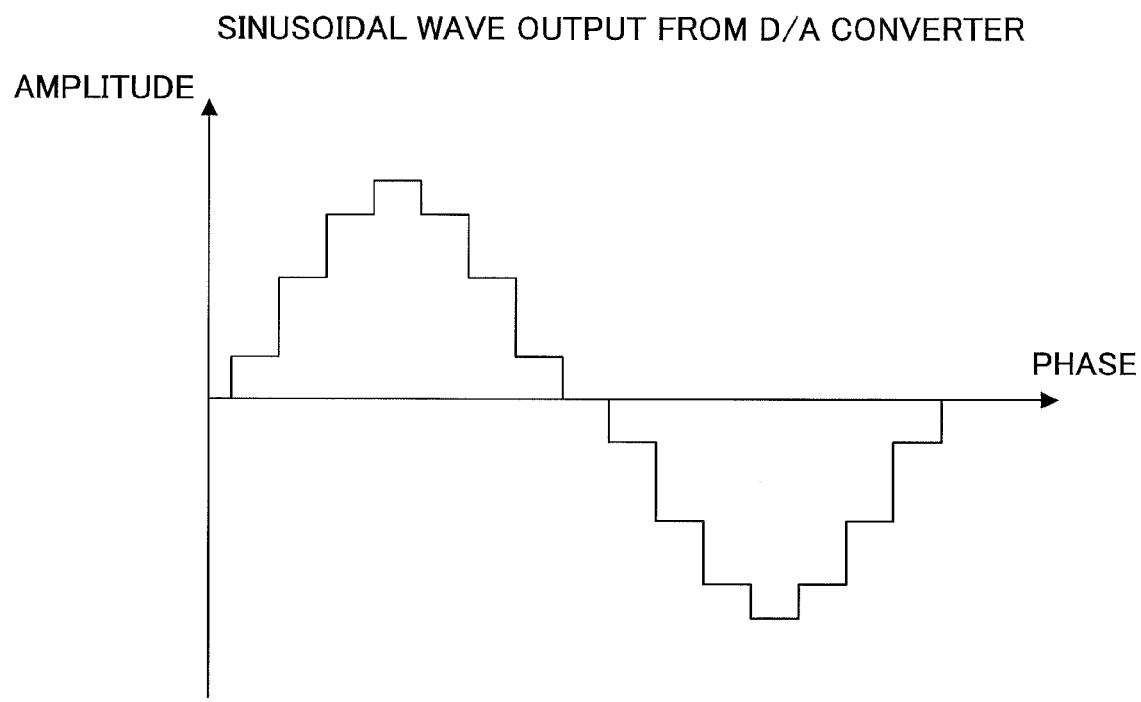
FIG. 16 is a graph illustrating an example of a sinusoidal wave output from a D/A converter of a sinusoidal wave generation part of a power supply device according to the fifth embodiment of the present invention.

FIG. 16 is a graph illustrating an example of a sinusoidal wave output from the D/A converter 22 of the sinusoidal wave generation part 7 of the power supply device according to the fifth embodiment of the present invention.

Figure 17:
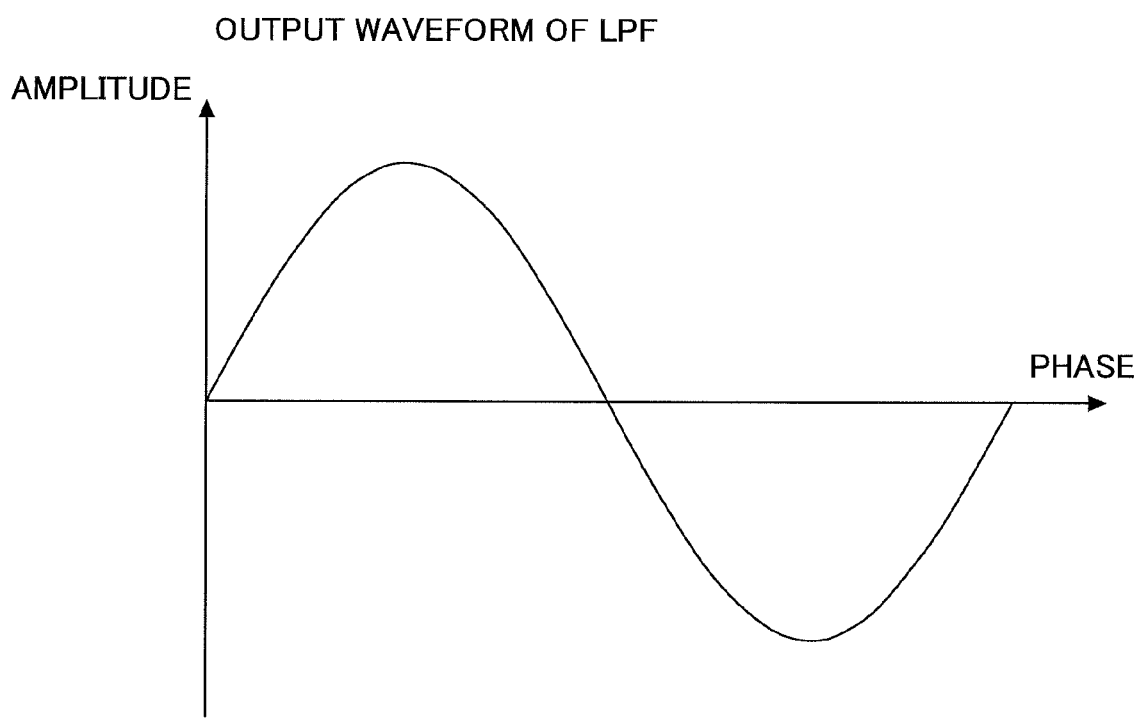
FIG. 17 is a graph illustrating an example of a sinusoidal wave output from a D/A converter of a sinusoidal wave generation part 7 according to an embodiment of the present invention.

FIG. 17 is a graph illustrating an example of a sinusoidal wave output from the D/A converter 22 of the sinusoidal wave generation part 7 (as in the second embodiment of the present invention) where the LPF 35 is connected to the output of the D/A 22 of the sinusoidal wave generation part 7. By connecting the LPF 35 to the output of the D/A 22, the waveform of the sinusoidal wave output from the LPF 35 is smoother compared to the sinusoidal wave output from the D/A 22.

Figure 18:
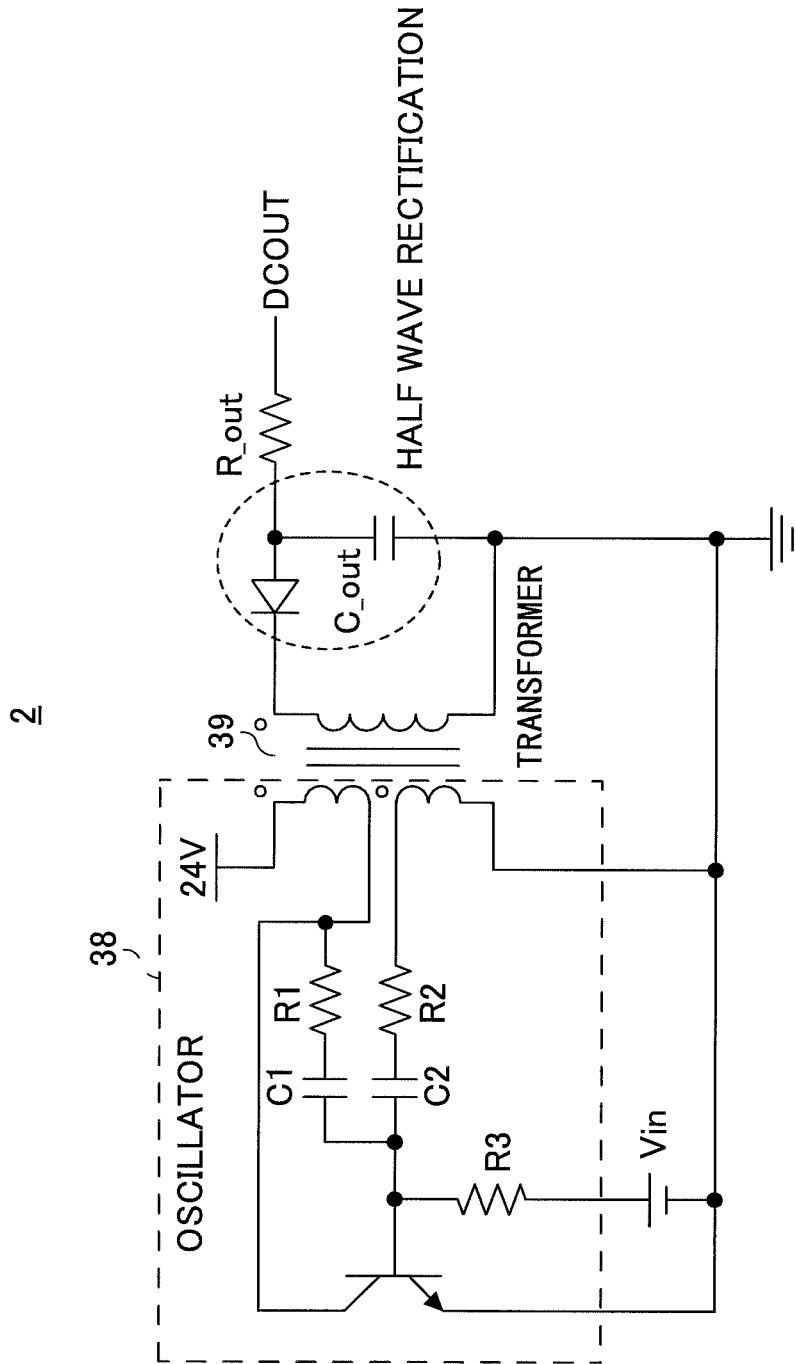
FIG. 18 is a circuit diagram illustrating an example of a DC voltage generation part according to an embodiment of the present invention.

FIG. 18 is a circuit diagram illustrating an example of the DC voltage generation part 2 according to an embodiment of the present invention. In the circuit of the DC voltage generation part 2 illustrated in FIG. 18, an oscillator (oscillation circuit) oscillates when voltage is applied to Vin. Thereby, a high voltage is generated at a secondary side of a transformer 39. By performing half-wave rectification on the generated high voltage, DC voltage is output from a DC OUT terminal.

Figure 19:
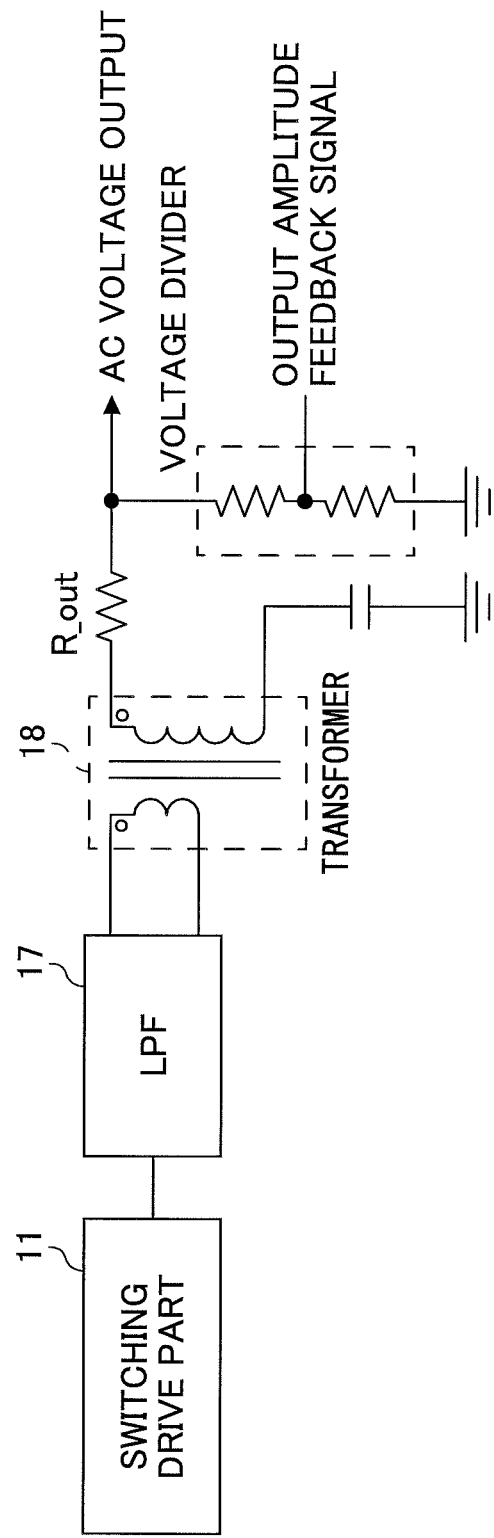
FIG. 19 is a schematic diagram illustrating an exemplary configuration of a feedback system according to an embodiment of the present invention.
Figure 20:
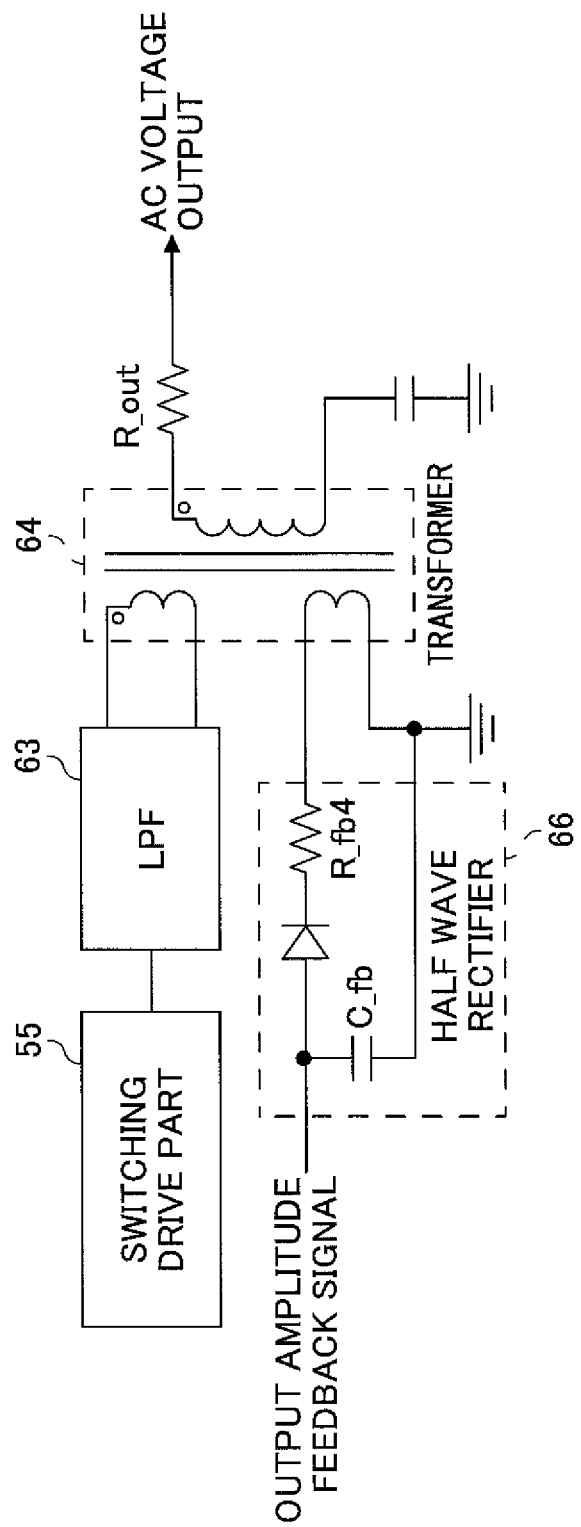
FIG. 20 is a schematic diagram illustrating a feedback system according to a related art example.
Figure 21:
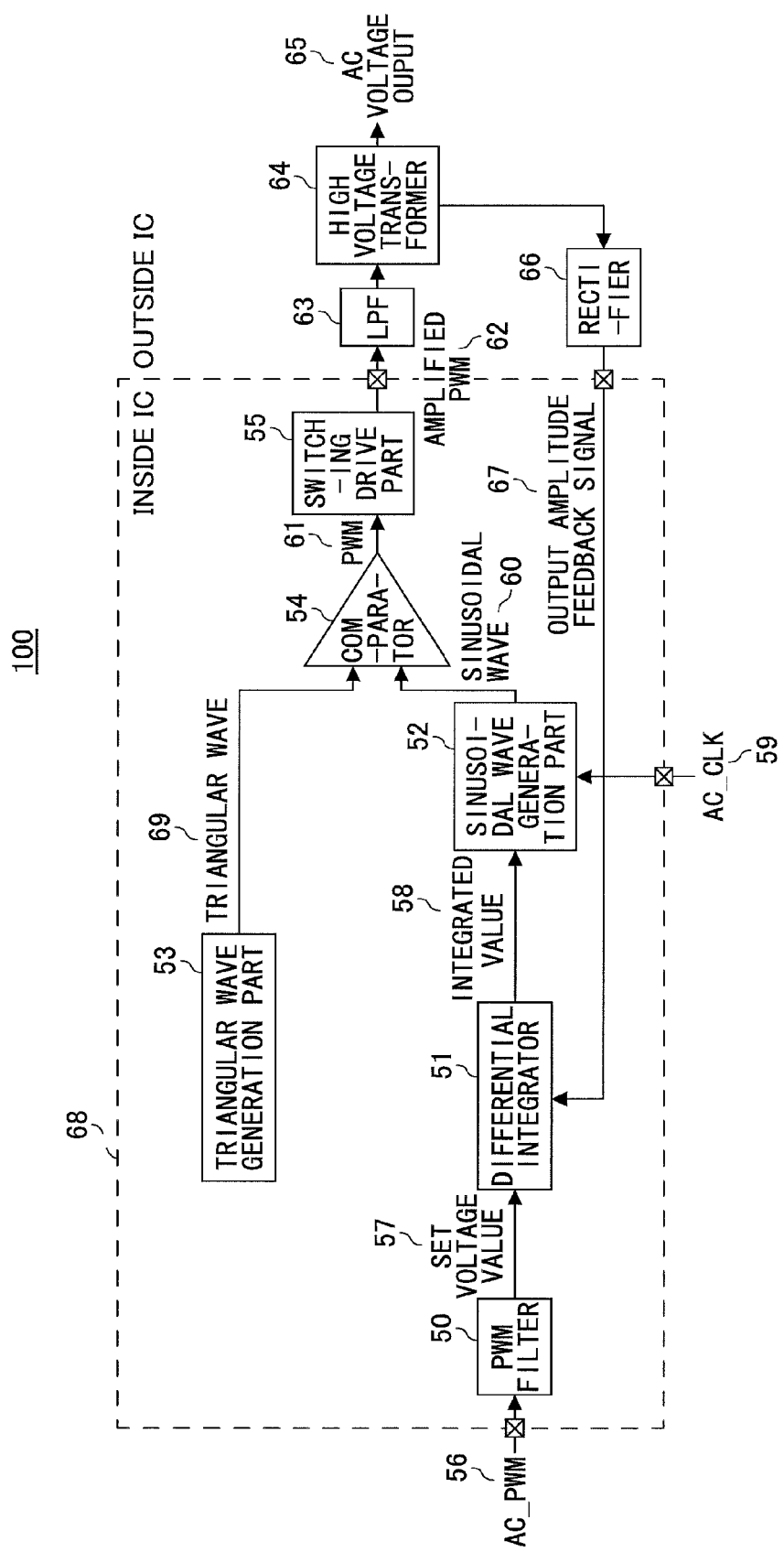
FIG. 21 is a schematic diagram illustrating a power supply device of the related art example illustrated in FIG. 21.

FIG. 19 is a schematic diagram illustrating an exemplary configuration of a feedback system according to an embodiment of the present invention. Because the voltages of the feedback system and the output terminals are divided by the voltage divider 20 and monitored, the control speed of the power supply device 1 can be increased. Further, by directly monitoring the changes of output of the transformer 18, the AC voltage generation part 3 can respond to load changes. In other words, the differential integrator 8 monitors the output voltage divided by resistors of the voltage divider 20. With this configuration, because the power supply device 1 can be controlled faster than the cycle of the sinusoidal wave, the voltage level of each moment can be compared with a reference sinusoidal wave shape. Accordingly, the AC voltage generation part 3 can quickly respond to changes of load. In contrast, a power supply device of a related art example is controlled by monitoring plural cycles of sinusoidal waves for performing half wave rectification on a sinusoidal wave and determining whether the amplitude of the monitor results is greater than/less than a predetermined criterion. Thus, the control speed of the power supply device of the related art example becomes slower than the cycle of the sinusoidal wave. As a result, the response of the power supply device of the related art example with respect to load changes is delayed.

The present invention is not limited to the specifically disclosed embodiments, and variations and modifications may be made without departing from the scope of the present invention.

The present application is based on Japanese Priority Application No. 2010-202017 and 2011-135134 filed on Sep. 9, 2010 and Jun. 17, 2011, respectively, the entire contents of which are hereby incorporated herein by reference.

What is claimed is:

1. A power supply device comprising:
   an AC generation part including
      a sinusoidal wave generation part that generates a first sinusoidal wave signal;
      an integrator that integrates a difference between the first sinusoidal wave signal and a feedback signal,
      a triangular wave generation part that generates a triangular wave signal,
      a comparator that compares an output of the integrator and the triangular wave signal and outputs a PWM signal,
      a switching drive part that amplifies the PWM signal and outputs an amplified PWM signal,
      a filter that converts the amplified PWM signal into a second sinusoidal wave signal,
      a transformer that increases a voltage of the second sinusoidal wave signal and outputs an AC voltage, and
      a voltage divider that divides the AC voltage and generates the feedback signal; and
   a DC generation part that generates a DC voltage;
   wherein the power supply device is configured to superimpose the AC voltage and the DC voltage and output a superimposed voltage,
   wherein the sinusoidal wave generation part includes
      a table configured to retain data of a plurality of bit patterns corresponding to a ¼ cycle of the first sinusoidal wave signal,
      an operator that contains a counter and that is configured to read out the data of the plurality of bit patterns corresponding to the ¼ cycle of the first sinusoidal wave signal, calculate a bit string of 3 subsequent cycles of the first sinusoidal wave signal based only on the read out data of the plurality of bit patterns corresponding to the ¼ cycle of the first sinusoidal wave signal, and output a calculation result, and
      a D/A converter configured to convert the calculation result into analog data signals.

2. The power supply device as claimed in claim 1, wherein the first sinusoidal wave signal has an amplitude and a frequency that are set in accordance with a predetermined value.

3. The power supply device as claimed in claim 2, wherein the amplitude and the frequency set in accordance with the predetermined value are transmitted by serial communication.

4. The power supply device as claimed in claim 1, wherein the sinusoidal wave generation part and the integrator constitute a digital circuit; and
   wherein the sinusoidal wave generation part includes an A/D converter that converts the feedback signal into digital data and feeds back the digital data to the integrator.

5. The power supply device as claimed in claim 1, wherein the switching drive part is an external component mounted to the outside of the power supply device.

6. The power supply device as claimed in claim 1, wherein the AC generation part further includes a LPF (Low Pass Filter), and wherein the LPF filter is connected between the sinusoidal wave generation part and the integrator.

7. An image forming apparatus comprising:
   the power supply device as claimed in claim 1.

8. A color image forming apparatus comprising:
   the power supply device as claimed in claim 1.

9. A power supply device comprising:
   an AC generation part including
      a sinusoidal wave generation part that generates a first sinusoidal wave signal;
      an integrator that integrates a difference between the first sinusoidal wave signal and a feedback signal,
      a $\Sigma\Delta$ D/A converter that generates a PWM signal,
      a switching drive part that amplifies the PWM signal and outputs an amplified PWM signal,
      a filter that converts the amplified PWM signal into a second sinusoidal wave signal,
      a transformer that increases a voltage of the second sinusoidal wave signal and outputs an AC voltage, and
      a voltage divider that divides the AC voltage and generates the feedback signal; and
   a DC generation part that generates a DC voltage;
   wherein the power supply device is configured to superimpose the AC voltage and the DC voltage and output a superimposed voltage,
   wherein the sinusoidal wave generation part includes
      a table configured to retain data of a plurality of bit patterns corresponding to a ¼ cycle of the first sinusoidal wave signal,
      an operator that contains a counter and that is configured to read out the data of the plurality of bit patterns corresponding to the ¼ cycle of the first sinusoidal wave signal, calculate a bit string of 3 subsequent cycles of the first sinusoidal wave signal based only on the read out data of the plurality of bit patterns corresponding to the ¼ cycle of the first sinusoidal wave signal, and output a calculation result, and
      a D/A converter configured to convert the calculation result into analog data signals.

10. An image forming apparatus comprising:
    the power supply device as claimed in claim 9.

11. A color image forming apparatus comprising:
    the power supply device as claimed in claim 9.

* * * * *